E. M. LYON.
DIRIGIBLE HEADLIGHT FOR VEHICLES.
APPLICATION FILED JAN. 3, 1917.
1,240,354.
Patented Sept. 18, 1917.
2 SHEETS—SHEET 1.
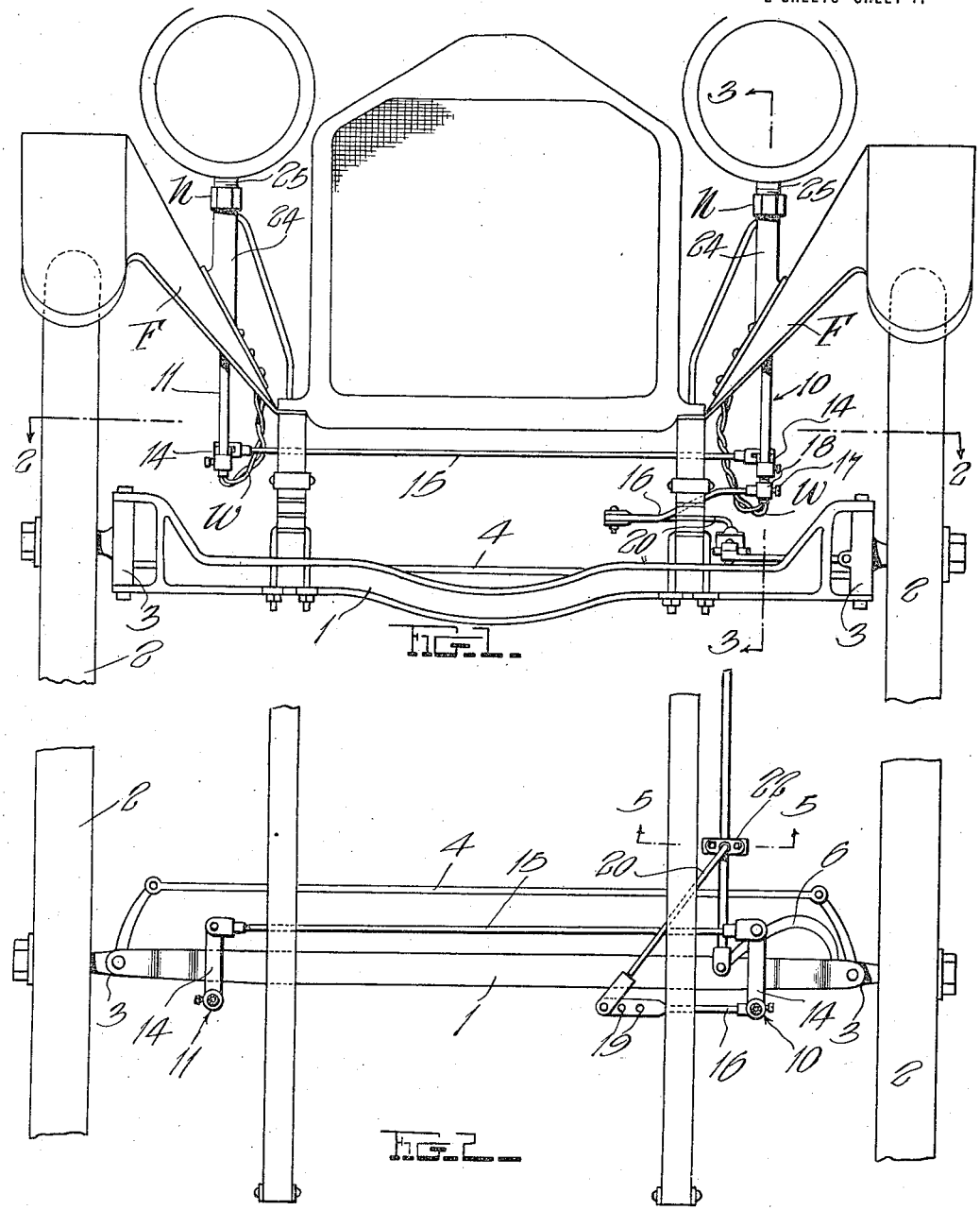

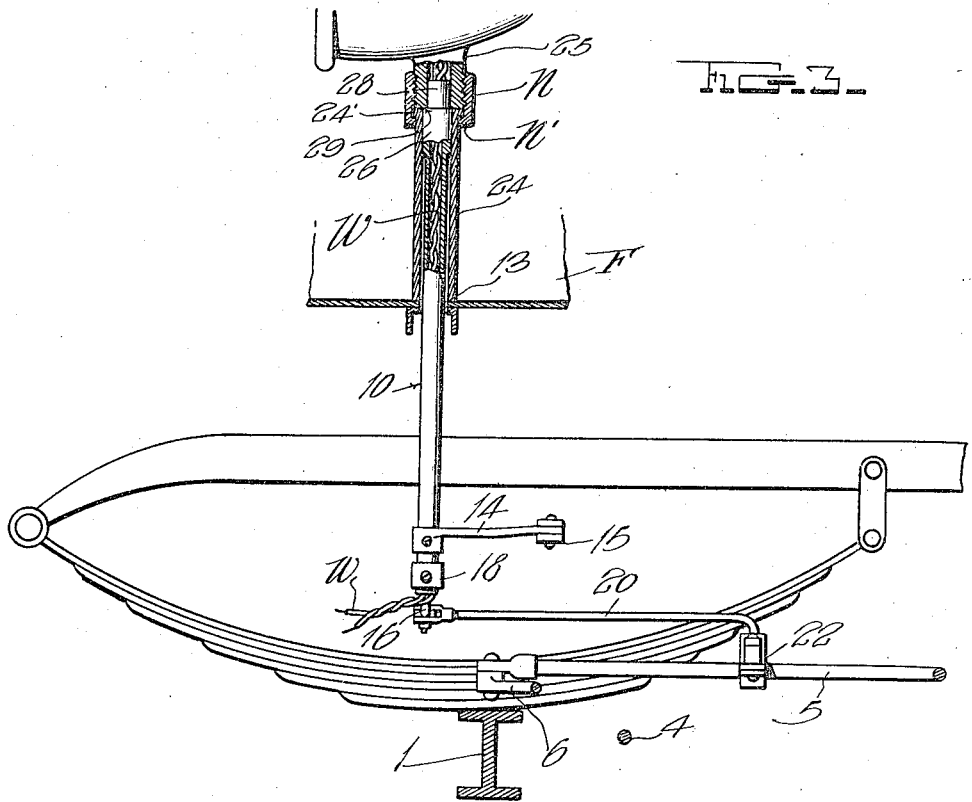
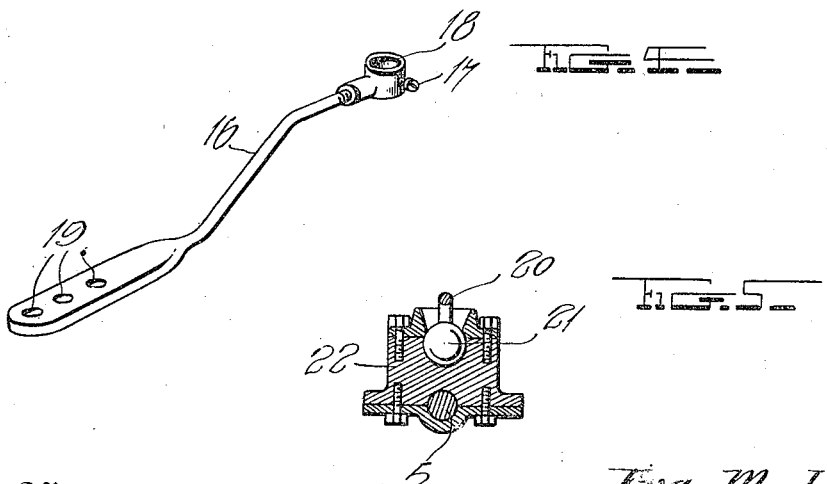

UNITED STATES PATENT OFFICE.

EVA M. LYON, OF ESCONDIDO, CALIFORNIA.

DIRIGIBLE HEADLIGHT FOR VEHICLES.

1,240,354.  Specification of Letters Patent.  Patented Sept. 18, 1917.

Application filed January 3, 1917. Serial No. 140,425.

*To all whom it may concern:*

Be it known that I, EVA M. LYON, a citizen of the United States, residing at Escondido, in the county of San Diego and State of California, have invented certain new and useful Improvements in Dirigible Headlights for Vehicles; and I do declare the following to be a full, clear, and exact description of the invention, such as will enable others skilled in the art to which it appertains to make and use the same.

This invention relates to improvements in dirigible headlights for motor and other vehicles.

The object of the invention is to provide a simple and efficient lamp operating mechanism by which the lamps may be simultaneously turned with the turning of the front or steering wheels of the vehicle so as to throw the light rays in the direction in which the vehicle is steered and which mechanism is adjustable so that the lamps may be turned the same distance the steering wheels are turned or a greater distance than said wheels as may be desired.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:

Figure 1 represents a front view of a Studebaker car equipped with this invention:

Fig. 2 is a horizontal section:

Fig. 3 is a detail side elevation partly in section;

Fig. 4 is a detail perspective view of link 16;

Fig. 5 is a transverse section through the ball and socket joint.

The lamp operating mechanism constituting this invention may be applied to various makes of automobiles and in the embodiment illustrated a Studebaker car is shown equipped therewith. In this embodiment 1 represents the front axle upon the ends of which the steering wheels 2 are mounted in the usual manner. The knuckles 3 of the steering wheels are connected by a transverse rod 4 so that said wheels are simultaneously turned in the direction of the steering mechanism. This steering mechanism which is of any approved construction now in general use includes a steering rod 5 arranged longitudinally of the car and which is connected to the steering shaft actuated from the customary steering post. The other end of this rod 5 is pivotally connected to the steering arm 6 which is rigidly secured to one of the steering wheel knuckles. This arrangement of steering gear is quite common and constitutes no part of the present invention.

The lamp controlling and operating mechanism constituting the invention includes two lamp supports 10 and 11 which are exactly alike and hence one only will be described in detail. The support 10 is in the form of a tubular post through which the circuit wires W which supply the current for the light are designed to extend and which enter the lamp at the rear of the deflector.

These posts 10 and 11 have their upper ends enlarged as shown at 26 with their upper terminals 28 reduced and provided at their inner ends with shoulders 29. The stems or spindles 25 of the lamps are hollow and the post terminals 28 are driven therein and fixedly secured thereto. These lamp posts 10 and 11 are extended through apertures 13 in the fender F of the car, which holes are usually used for the passage of the wires W, consequently no change at all in the car is made, the holes being reamed out smooth.

A lateral arm 14 is rigidly connected with the lower end of each post 10 and 11, being preferably secured by means of set screws. These arms project rearwardly from said posts and are connected by a rod 15 so that both the lamp posts 10—11 will turn in unison when the vehicle is steered by actuating means presently to be described.

Fixed to the lamp post 10 which is located on the driving side of the car is a crank arm 16 which is in the form of a compound curve. This arm 16 is preferably secured to the post 10 by a set screw 17 passing through a collar 18 carried by said arm and encircling said post although obviously it may be secured in any other suitable manner. This arm 16 is shown in the form of a flat metal bar at the end opposite that which is attached to the post 10, and is provided with a plurality of longitudinally spaced apertures 19 to provide for its adjustable connection with a link 20 which connects said arm to the steering rod 5 of the car. The connection between the link 20 and the crank arm 16 may be made in any suitable manner, said link preferably having a bifurcated end, the furcations of which receive the flattened end of the arm 16. A bolt or the like is passed through said furcations and through one of the apertures 17 of the arm 16. Link 20 has a ball 21 at one end which is engaged with a socket member 22 clamped to the steering rod 5 of the car, forming a ball and socket connection between the steering rod and the crank arm 16.

When the parts are connected as above described it will be obvious that the turning of the steering wheel which imparts a reciprocatory motion to the steering rod 5 will operate to turn the front wheels of the car through the steering arm 6 and simultaneously turn the lamp posts 10 and 11 through the mechanism above described, thereby causing the lamps to throw their light directly in the path of the car in whatever direction it may be steered.

The apertures 19 in the crank arm 16 should be placed about three-fourths of an inch apart so that when the link 20 is engaged with the outermost aperture the lamps will be turned the exact distance that the steering wheels are turned and when it is engaged with the second or middle hole, the lamps will turn one and one-half inches further than the turning of the steering wheels in the same direction and when engaged with the third or innermost hole the lamps will turn three inches further than the steering wheels. When the link is engaged with the innermost hole the turning of the lamps takes place much more promptly than when the device is connected with the other holes.

While this mechanism is described and shown as applied to a Studebaker car it is to be understood that it may be applied to any car to which it is adapted.

The Studebaker car as now made has the lamps thereof mounted on tubular uprights 24 secured to the fenders F, their spindles 25 being hollow and secured to the uprights 24 by large locknuts N with spring washers arranged inside said nuts. To apply this invention, these locknuts are loosened, the spring washers removed, and the tubes 10 and 11 driven into the spindles 25. The reduced upper terminals 28 of the tubes 10 and 11 are reduced to fit in the lamp spindles 25, a drive fit being provided between them and shoulders 29 formed at the inner ends of said terminals against which the lower ends of spindles 25 abut. Each nut or coupling N has threaded engagement with one of the spindles 25 and a swiveled connection with upright 24. The coupling N has an inturned flange N' which engages an outturned flange 24' on the upper end of the upright 24 so that the lamp and the coupling will turn freely on the turning of the post engaged with said lamp.

While the principle of operation of the invention together with the device which is considered to be the best embodiment thereof is herein described, it is desired to have it understood that the device is merely illustrative and that such changes may be made therein as may fall within the scope of the claimed invention.

I claim:

1. The combination with a vehicle having a steering mechanism and a tubular lamp supporting bracket secured on the fender of the vehicle with an opening in the fender communicating therewith, a tubular lamp post extending loosely through the fender and said bracket, a lamp fixed to the upper end of said post, a coupling member between said lamp and bracket for swivel connection therebetween, and a connection between said post and steering mechanism whereby said lamp is turned in said bracket on the operation of the steering mechanism.

2. The combination with a vehicle having a steering mechanism and a tubular lamp supporting bracket secured on the fender of the vehicle with an opening in the fender communicating therewith, a tubular lamp post extending loosely through the fender and said bracket, the upper terminal of said post being reduced with a shoulder at its inner end, a lamp having a hollow stem into which said post terminal extends and is fixed thereto, a coupling having fixed engagement with said stem and swivel connection with said bracket, and a connection between said post and steering mechanism whereby said lamp is turned in said bracket when the steering mechanism is operated.

3. A device of the character described comprising in combination a tubular lamp supporting bracket, a tubular lamp post to be extended loosely through said bracket and having a reduced terminal, a lamp having a hollow stem to receive said terminal in secured relation, one end of said stem being adapted for support on the end of said bracket, a swivel coupling member for the engaging ends of said bracket and stem, and means to oscillate said lamp post to turn the lamp as desired.

4. A device of the character described comprising in combination a tubular lamp supporting bracket, a tubular lamp post to be extended loosely through said bracket and having a reduced terminal, a lamp having a hollow stem to receive said terminal in secured relation therein, and communicate therewith, the adjacent end of said stem being of larger diameter than the lamp post to form a shoulder, said shoulder being adapted to rest on the adjacent end of the bracket, a coupling member in fixed engagement with said stem and in swiveled engagement with said bracket, and means at the opposite end of the lamp post to oscillate the post and turn the lamp as desired.

In testimony whereof I have hereunto set my hand in the presence of two subscribing witnesses.

EVA M. LYON.

Witnesses:
A. R. MAYNARD,
L. N. TURRENTINE.

Copies of this patent may be obtained for five cents each, by addressing the "Commissioner of Patents Washington, D. C."